US011118948B2

(12) United States Patent
Ryan et al.

(10) Patent No.: US 11,118,948 B2
(45) Date of Patent: Sep. 14, 2021

(54) SYSTEMS AND METHODS OF CALIBRATING VEHICLE SENSORS USING AUGMENTED REALITY

(71) Applicant: Toyota Motor North America, Inc., Plano, TX (US)

(72) Inventors: Philip W. Ryan, Frisco, TX (US); Yeshwant K. Muthusamy, Allen, TX (US); Amit Chaudhary, Frisco, TX (US); Tyler Jacob Mironas, Dallas, TX (US); Christopher M. Ansert, Celina, TX (US); Srdjan Stekovic, McKinney, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 0 days.

(21) Appl. No.: 16/549,416

(22) Filed: Aug. 23, 2019

(65) Prior Publication Data

US 2021/0055141 A1 Feb. 25, 2021

(51) Int. Cl.
*G01D 18/00* (2006.01)
*G06T 3/00* (2006.01)
*G06T 11/00* (2006.01)

(52) U.S. Cl.
CPC .......... *G01D 18/00* (2013.01); *G06T 3/0068* (2013.01); *G06T 11/00* (2013.01)

(58) Field of Classification Search
None
See application file for complete search history.

(56) References Cited

U.S. PATENT DOCUMENTS

| 6,128,585 | A | 10/2000 | Greer |
| 7,324,081 | B2 | 1/2008 | Friedrich et al. |
| 9,149,929 | B2 | 10/2015 | Motzer et al. |
| 9,621,821 | B2* | 4/2017 | Le Clerc ............... G05D 1/101 |

(Continued)

FOREIGN PATENT DOCUMENTS

DE 102014118625 A1 6/2016

OTHER PUBLICATIONS

Bosch DAS 1000 calibration set: professional adjustment of sensors and cameras of driver assistance systems (https://www.bosch-presse.de/pressportal/de/enibosch-das-1000-calibration-set-professional-adjustment-of-sensors-and-cameras-of-driver-assistance-systems-151808.html) Published date: Mar. 19, 2019.

*Primary Examiner* — YuJang Tswei
(74) *Attorney, Agent, or Firm* — Dinsmore & Shohl LLP (57) ABSTRACT

A system and method for displaying a placement array of calibration locations, including capturing image data of a target object located in a workspace using an optical sensor communicatively coupled to a processor. Classification data is received from a database, based on the image data of on the target object within the view of the optical sensor. An origin point of the placement array of calibration locations based on the image data is determined. A plurality of calibration positions for the workspace in relation to the origin point is retrieved from the database, where the calibration locations are based on the classification data from the image data. The placement array of calibration locations is displayed on a display communicatively coupled to the processor in an augmented reality depiction of the workspace, where the placement array of calibration locations is oriented in the workspace based on the origin point.

20 Claims, 8 Drawing Sheets

(56) References Cited

U.S. PATENT DOCUMENTS

| | | | |
|---|---|---|---|
| 9,734,419 B1* | 8/2017 | Ye | G06T 7/85 |
| 9,870,645 B2 | 1/2018 | Montaigne et al. | |
| 10,445,899 B1* | 10/2019 | Dagley | G06K 9/3216 |
| 2007/0053003 A1* | 3/2007 | Loce | H04N 1/40075 |
| | | | 358/3.06 |
| 2017/0239892 A1* | 8/2017 | Buller | B22F 3/1055 |
| 2018/0350056 A1* | 12/2018 | Cardenas Bernal | |
| | | | G01N 21/9515 |
| 2019/0056483 A1 | 2/2019 | Bradley et al. | |
| 2019/0176862 A1* | 6/2019 | Kumar | G06K 9/00651 |
| 2019/0204425 A1* | 7/2019 | Abari | G01S 17/931 |

* cited by examiner

SYSTEMS AND METHODS OF CALIBRATING VEHICLE SENSORS USING AUGMENTED REALITY

TECHNICAL FIELD

The present specification generally relates to systems and methods of calibrating vehicle sensors and, more specifically, to systems and methods of calibrating vehicle sensors using optical sensors and augmented reality.

BACKGROUND

Vehicles may include sensors arranged on the vehicle, and are relied on heavily for certain driver aids, such as lane departure and collision warnings. When a sensor fails or needs to be replaced, the new sensor must be calibrated once installed into the vehicle. The calibration process of vehicle sensors requires calibration reflectors to be placed at specific locations in front of the vehicle in order to calibrate the sensors. The placement of the calibration reflectors requires a technician to use physical measuring guides (such as a tape measurer and strings) and a specific listing of dimensions in order to place the calibration reflectors around the vehicle at the correct locations. Not only is this process time consuming, there is can be potential for error if the technician takes an incorrect measurement or uses the incorrect dimensions for the specific model of vehicle.

Accordingly, there is a need for systems and methods for calibrating sensors arranged on vehicles which includes a minimal possibility of including human error.

SUMMARY

In one embodiment, a system for displaying a placement array of calibration locations, includes an optical sensor, a display communicatively coupled to the optical sensor, a processor, one or more memory modules communicatively coupled to the processor, and machine readable instructions stored in the one or more memory modules that cause the optical sensor and display to perform the following method when executed by the processor. Capturing image data of a target object located in a workspace using the optical sensor communicatively coupled to the processor. Classification data is retrieved from a database communicatively coupled to the processor, where the classification data is received based on the image data based on the object within the view of the optical sensor. An origin point of the placement array of calibration locations based on the image data is determined. A plurality of calibration positions for the workspace in relation to the origin point is retrieved from the database, where the calibration locations are based on the classification data from the image data. The placement array of calibration locations is displayed on a display communicatively coupled to the processor in an augmented reality depiction of the workspace, where the placement array of calibration locations is oriented in the workspace based on the origin point.

In another embodiment, a method for displaying a placement array of calibration locations includes positioning a reference marker on an at least one physical feature of the target object. An origin point of the placement array of calibration locations is determined using the reference marker. A visual indicator corresponding to the origin point is arranged adjacent to the target object. Image data of the target object and the visual indicator located in a workspace is captured using an optical sensor communicatively coupled to a processor. A plurality of calibration locations of the placement array for the workspace in relation to the origin point is retrieved from a database communicatively coupled to the processor. The placement array of calibration locations is displayed on a display communicatively coupled to the processor in an augmented reality depiction of the workspace, where the placement array of calibration locations is oriented in the workspace based on the visual indicator of the origin point.

In another embodiment, a method for displaying a placement array of calibration locations includes capturing image data of the target object located in a workspace using an optical sensor communicatively coupled to a processor. An image of an at least one physical feature of the target object is overlaid onto a display communicatively coupled to the processor. The image of the at least one physical feature of the target object is arranged on the display with the target object using the optical sensor. An origin point of the workspace is determined based on the alignment of the image of the at least one physical feature of the target object with the target object through the optical sensor. A plurality of calibration locations of the placement array for the workspace in relation to the origin point is retrieved from a database communicatively coupled to the processor. The placement array of calibration locations is displayed in an augmented reality depiction of the workspace, where the placement array of calibration locations is oriented in the workspace based on the origin point.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
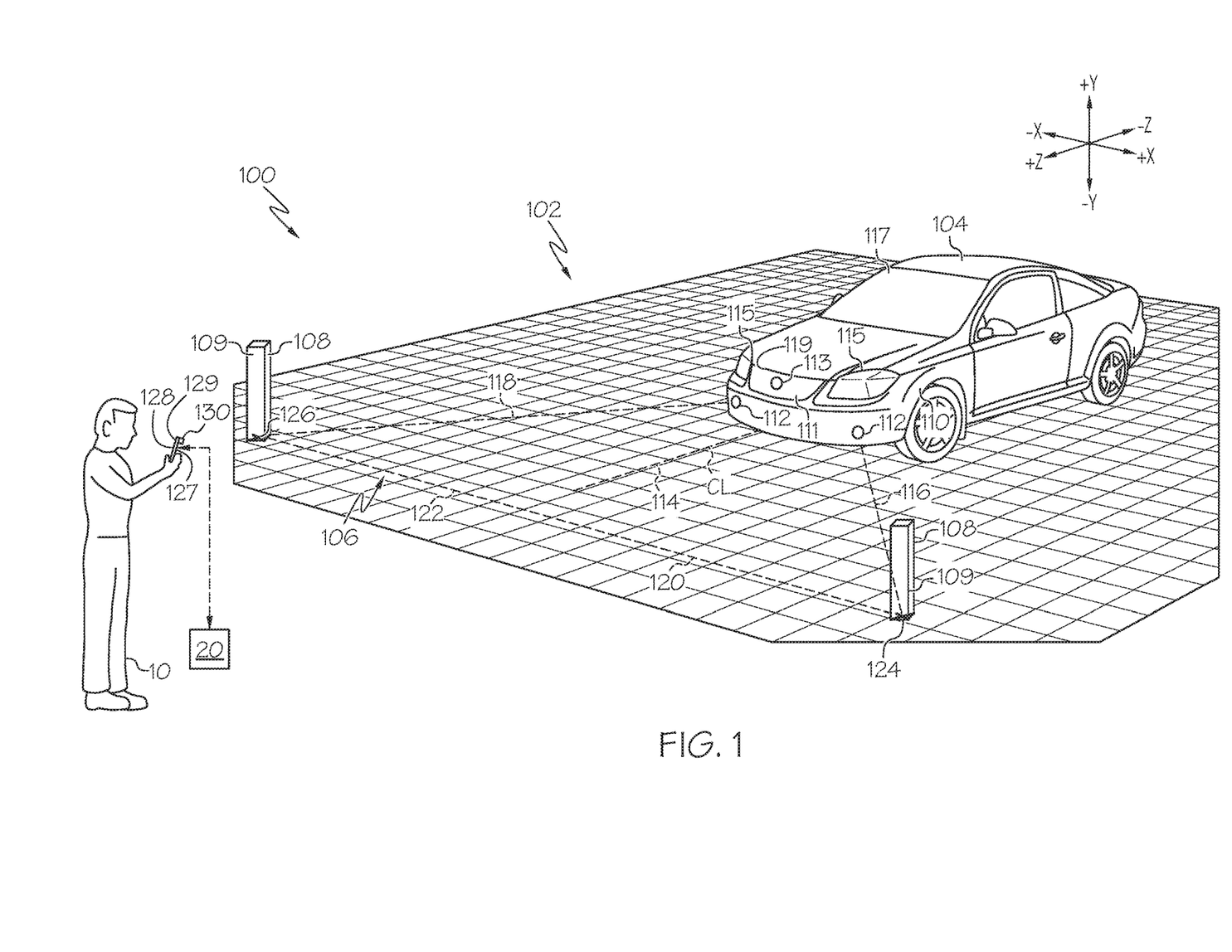
FIG. 1 schematically depicts a vehicle and a placement array of calibration locations within a workspace, according to one or more embodiments shown or described herein.

FIG. 1 generally depicts an embodiment of a system and method for displaying a placement array of calibration locations. As will be described in greater detail herein, the system and method includes capturing image data of a target object located in a workspace using an optical sensor communicatively coupled to a processor. Classification data is received from a database based on the image data of the target object. An origin point of the placement array of calibration locations is also determined based on the image data. A plurality of calibration positions for the workspace in relation to the origin point is retrieved from the database, where the calibration locations are based on the classification data from the image data. The placement array of calibration locations is displayed on a display communicatively coupled to the processor in an augmented reality depiction of the workspace, where the placement array of calibration locations is oriented in the workspace based on the origin point. Furthermore, the system and method for displaying a placement array of calibration locations minimizes human error in order to calibrate sensors on the vehicle. Accordingly, the method for displaying a placement array of calibration locations can be more accurate and less time consuming than traditional methods using measuring means such as string or tape. Various embodiments of the method for displaying a placement array of calibration locations will be described in greater detail herein.

As used herein, the term "vehicle longitudinal direction" refers to the forward-rearward direction of the vehicle (i.e., in the +/− vehicle Z-direction of the depicted coordinate axes). The term "vehicle lateral direction" refers to the cross-vehicle direction of the vehicle (i.e., in the +/− vehicle X-direction of the depicted coordinate axes), and is transverse to the vehicle longitudinal direction. The term "vehicle vertical direction" refers to the upward-downward direction of the vehicle (i.e., in the +/− vehicle Y-direction of the depicted coordinate axes). As used herein, "upper" and "above" are defined as the positive Y direction of the coordinate axis shown in the drawings. "Lower" and "below" are defined as the negative Y direction of the coordinate axis shown in the drawings. Further, the terms "outboard" as used herein refers to the relative location of a component with respect to a vehicle centerline. The term "inboard" as used herein refers to the relative location of a component with respect to the vehicle centerline. Because the vehicle structures may be generally symmetrical about a vehicle centerline, the direction to which use of terms "inboard" or "outboard" and refer may be mirrored about the vehicle centerline when evaluating components positioned along opposite sides. Additionally, the term "calibration" as used herein refers to the process which is described herein in order to determine if sensors arranged on or within a vehicle are correctly positioned within or on the vehicle. However, the term "calibration" can be interchanged with the terms "initialization," "adjustment," "operation check," and/or "learn value" without unduly limiting the scope of the present specification.

Referring now to FIG. 1, an embodiment of a calibration system 100 is generally depicted. As illustrated, the calibration system 100 may include a workspace 102, a vehicle 104 arranged within the workspace 102, a placement array 106, calibration targets 108, a display 128, and an optical sensor 130. The calibration system 100 may be operated by a user 10, or can be autonomously operated by placing the optical sensor 130 on a fixed stand (not shown). The display 128 and optical sensor 130 are communicatively coupled with a database 20, where the connection can be a wired or wireless connection.

In some embodiments, the workspace 102 is the area in which the calibration system 100 operates. The workspace 102 is designed to correspond as both a digital representation of the physical space which the vehicle 104 is arranged within during execution of a method by the calibration system 100, and the physical space itself. The size of the workspace 102 will vary from vehicle to vehicle, depending on the size of the vehicle 104 being calibrated, or based on the dimensions of the placement array 106. The user 10, display 128, and/or optical sensor 130 may or may not be arranged within the workspace 102 during execution of the method by the calibration system 100. For example, the user 10 and display 128 can be arranged to the side of the workspace 102 in the form of a computer monitor, while the optical sensor 130 is arranged within the workspace 102. In some embodiments, the optical sensor 130 is a mobile device camera or a stand-alone camera communicatively coupled to the display 128.

Referring again to FIG. 1, the vehicle 104 represents a target object of the calibration system 100. The vehicle 104 can be any vehicle, commercial or non-commercial. Additionally, the target objet represented by the vehicle 104 can be other objects which are not motor vehicles, such as boats, ATVs, snowmobiles, or any object which uses sensors to aid in driving and/or maneuvering, without departing from the scope of this disclosure.

In some embodiments, the vehicle 104 generally includes a front bumper 110, grille 111, vehicle sensors 112, logo 113, headlights 115, windshield 117, and hood 119. The vehicle sensors 112 may be arranged within the front bumper 110, but could also be placed anywhere on the vehicle 104, such as within headlights 115 or grille 111. The different physical features of the vehicle 104 (i.e., the grille 111, the logo 113, the headlights 115, the windshield 117, the hood 119, a taillight, a fog light, a lighting housing, a license plate, a license plate holder, a seam/gap between two or more panels, a seam or gap between two or more parts, a seam or gap between a body panel and non-body part, holes, slots, and/or uniquely shaped features on a part or panel,) can aid the calibration system 100 in determining what the optical sensor 130 is detecting. Additionally, non-visible components of the vehicle 104, such as infrared sensors placed behind a component of the vehicle 104, can be used to aid the calibration system 100 in determining what the optical sensor 130 is detecting, even if the component is no visible to the human eye.

Referring again to FIG. 1, the placement array 106 is based on the number of calibration targets 108 required to properly calibrate the vehicle sensors 112 and the locations within the workspace 102 where the calibration targets 108 need to be arranged. In some embodiments, the placement array 106 is in the form of a triangle, where the three vertices are the vehicle 104, a right calibration location 124, and a left calibration location 126. The vehicle 104, right calibration location 124, and left calibration location 126 are arranged within the workspace 102 in order to operate the calibration system 100. Additionally, the placement array 106 includes a centerline measurement 114, a right diagonal measurement 116, a left diagonal measurement 118, a right lateral measurement 120, and a left lateral measurement 122.

In some embodiments, the right and left measurements are symmetrical based on a true centerline CL of the vehicle 104, but can be asymmetrical also, depending on the vehicle 104 and vehicle sensors 112 being calibrated.

In some embodiments, the centerline measurement 114 is arranged in-line with the true centerline CL of the vehicle 104 and extends in the Z-direction. The centerline measurement 114 is the longitudinal measurement for the right calibration location 124 and the left calibration location 126. The true centerline CL of the vehicle 104 is determined by the calibration system 100 using optical sensor 130, and will be described in further detail below. The right diagonal measurement 116 and the left diagonal measurement 118 extend in both the longitudinal and lateral directions in the X-Z plane. In some embodiments, the right diagonal measurement 116 and the left diagonal measurement 118 may extend from the vehicle sensors 112 to the right calibration location 124 and the left calibration location 126, respectively, or may extend from an origin point 132 (FIG. 2) arranged adjacent to the vehicle 104 to the right calibration location 124 and the left calibration location 126. In some embodiments, the right lateral measurement 120 and the left lateral measurement 122 extend from the centerline measurement 114 outward toward the right calibration location 124 and the left calibration location 126, respectively, in the X-direction. The location in the workspace 102 at which the right diagonal measurement 116 intersects with the right lateral measurement 120 is the right calibration location 124, and the location in the workspace 102 at which the left diagonal measurement 118 intersects with the left lateral measurement 122 is the left calibration location 126.

Referring again to FIG. 1, the calibration targets 108 are pylons which are wrapped or coated in a material 109. The shape of the calibration targets 108 may be dependent on which vehicle 104 or vehicle sensors 112 are being calibrated by the calibration system 100. For example, the calibration targets 108 can include, but are not limited to frusto-conical cones, rectangular pylons, or flat panels. Additionally, the material 109 which is arranged on the outer surface of the calibration targets 108 may be made from a material which is easily detectable by the vehicle sensors 112 and optical sensor 130. For example, the material 109 may be made from a reflective substance or a fluorescent color which is easily discernable from the surrounding objects in the workspace 102. The calibration targets 108 can be picked up and rearranged within the workspace 102 in order to properly calibrate different vehicle model types, depending on where the right calibration location 124 and the left calibration location 126 are located within the workspace 102.

Referring again to FIG. 1, the display 128 and optical sensor 130 are communicatively coupled to one another and arranged within the same device 127, such as a tablet or mobile device. Where the display 128 and optical sensor 130 are arranged within the same device 127, the user 10 is able to operate the calibration system 100 in real-time by observing the workspace 102 through the live optical feed of the optical sensor 130 being displayed on the display 128. A processor 129 may be communicatively coupled to both the display 128 and optical sensor 130, and may also be arranged within the same device 127 as both components.

In some embodiments, the database 20 is communicatively coupled with the processor 129 via a wireless connection, but can be coupled through a wired connection as well. The information contained within the database 20 are the placement arrays 106 for a plurality of different vehicles 104. The information of each placement array 106 stored within the database 20 includes the centerline measurement 114, the right diagonal measurement 116, the left diagonal measurement 118, the right lateral measurement 120, the left lateral measurement 122, the right calibration location 124, and the left calibration location 126, for a plurality of different vehicles 104. The specific placement array 106 which is retrieved from the database 20 is based on classification data which is retrieved from the workspace 102 by the optical sensor 130, or the classification data can be manually inputted by the user 10.

Figure 2:
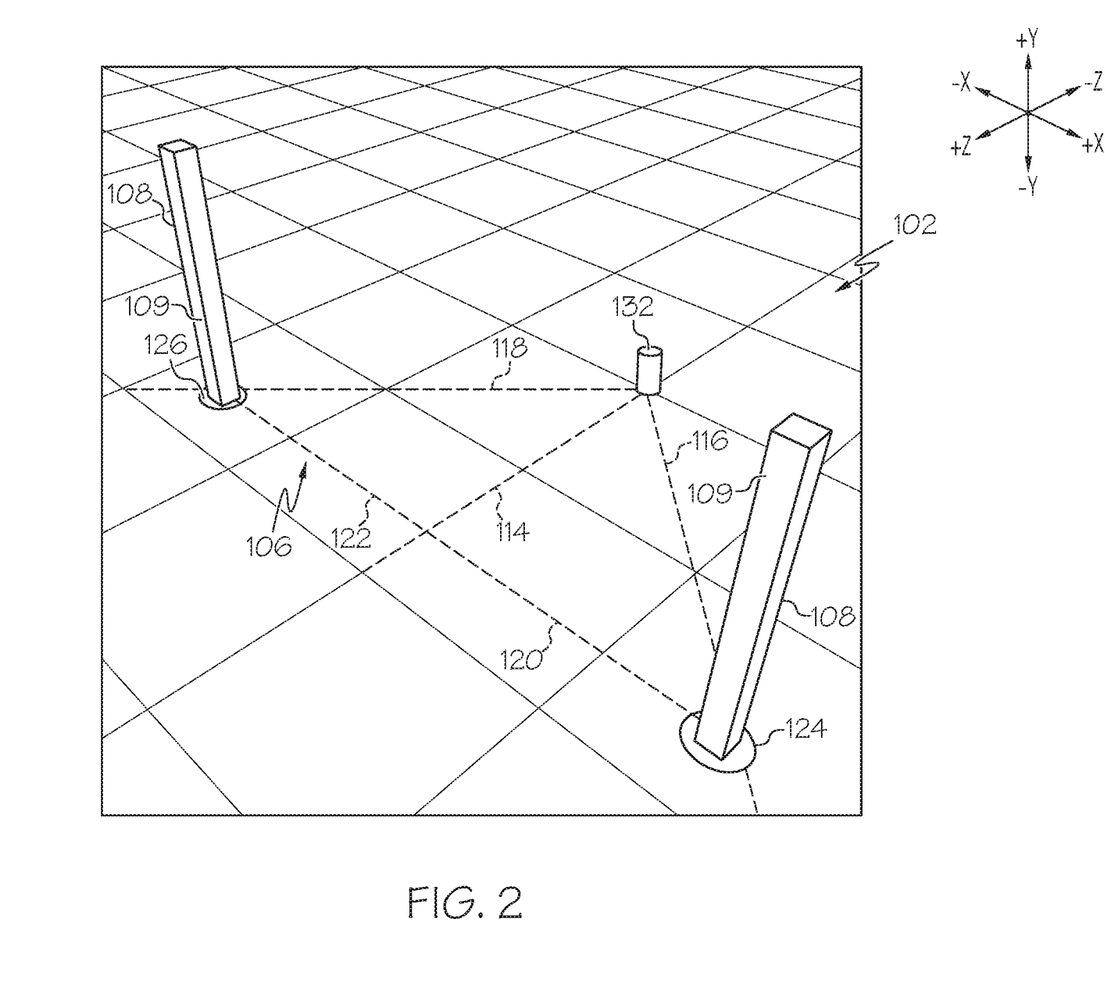
FIG. 2 schematically depicts the placement array of calibration locations within the workspace of FIG. 1, according to one or more embodiments shown or described herein.

Referring now to FIG. 2, the placement array 106 can be formed using the right calibration location 124, the left calibration location 126, and an origin point 132. In some embodiments, the calibration system 100 utilizes a fixed-point method by placing an origin point 132 within the workspace 102 which is adjacent to the vehicle 104. The origin point 132 may also be arranged within the workspace 102, where the right diagonal measurement 116 and the left diagonal measurement 118 extend from the origin point 132 towards the right calibration location 124 and the left calibration location 126, respectively. The origin point 132 may be a generalization of the vehicle 104 into a single point which the calibration system 100 determines is where to arrange the placement array 106 within the workspace 102. The determination of where to place the origin point 132 can be determined in multiple ways, which will be described in greater detail below.

Figure 3A:
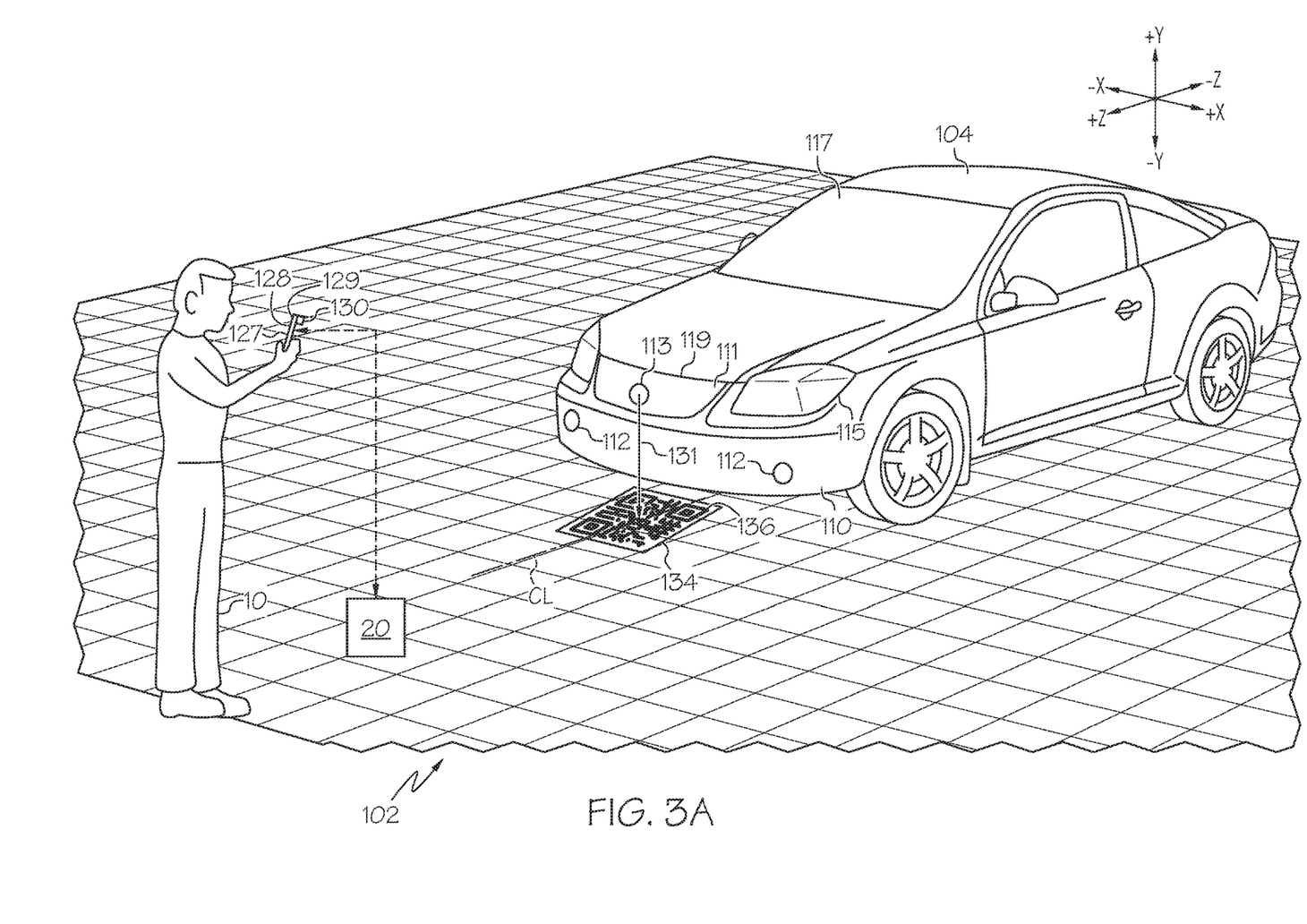
FIG. 3A schematically depicts the vehicle within the workspace of FIG. 1, according to one or more embodiments shown or described herein.

Referring now to FIG. 3A, a method of determining the origin point 132 is generally depicted. A reference marker 131 is arranged on the vehicle 104 at a known central location, for example, on the logo 113 arranged on the grille 111. The reference marker 131 can be a laser or optical device which projects a marker in the −Y-direction onto the floor of the workspace 102. Additionally, the reference marker 131 can be a mechanical device such as a plumb bob attached to a string, which is secured to the logo 113. Even further, the reference marker 131 can be a physical object, such as a sticker containing a visual indicator 136, arranged directly on the vehicle 104 at a known central location, such as over the logo 113. With the reference marker 131 in place on the vehicle 104, the true centerline CL is now shown to the user 10 on the floor of the workspace 102. A substrate 134 is then placed over the true centerline CL using the reference marker 131. The location of the substrate 134 can be adjacent to the front bumper 110 in the +Z-direction, or can be arranged underneath the front bumper 110, so as long as the optical sensors 130 has a sight path to the substrate 134. Arranged on the substrate 134 is a visual indicator 136, where the visual indicator 136 is able to be detected and read in by the optical sensor 130. For example, the visual indicator 136 can be a QR code, but any visual image which can be read by the optical sensors 130 would be sufficient.

In some embodiments, a plurality of visual indicators 136 correspond to the plurality of placement arrays 106 stored within database 20 for a plurality of different vehicles. The visual indicator 136 can correspond to the make and model of the vehicle 104 being calibrated. Once the visual indicator 136 is scanned by the optical sensor 130, the processor 129 can communicatively couple with the database 20 in order to retrieve the correct placement array 106 for the specific vehicle 104 being calibrated.

Figure 3B:
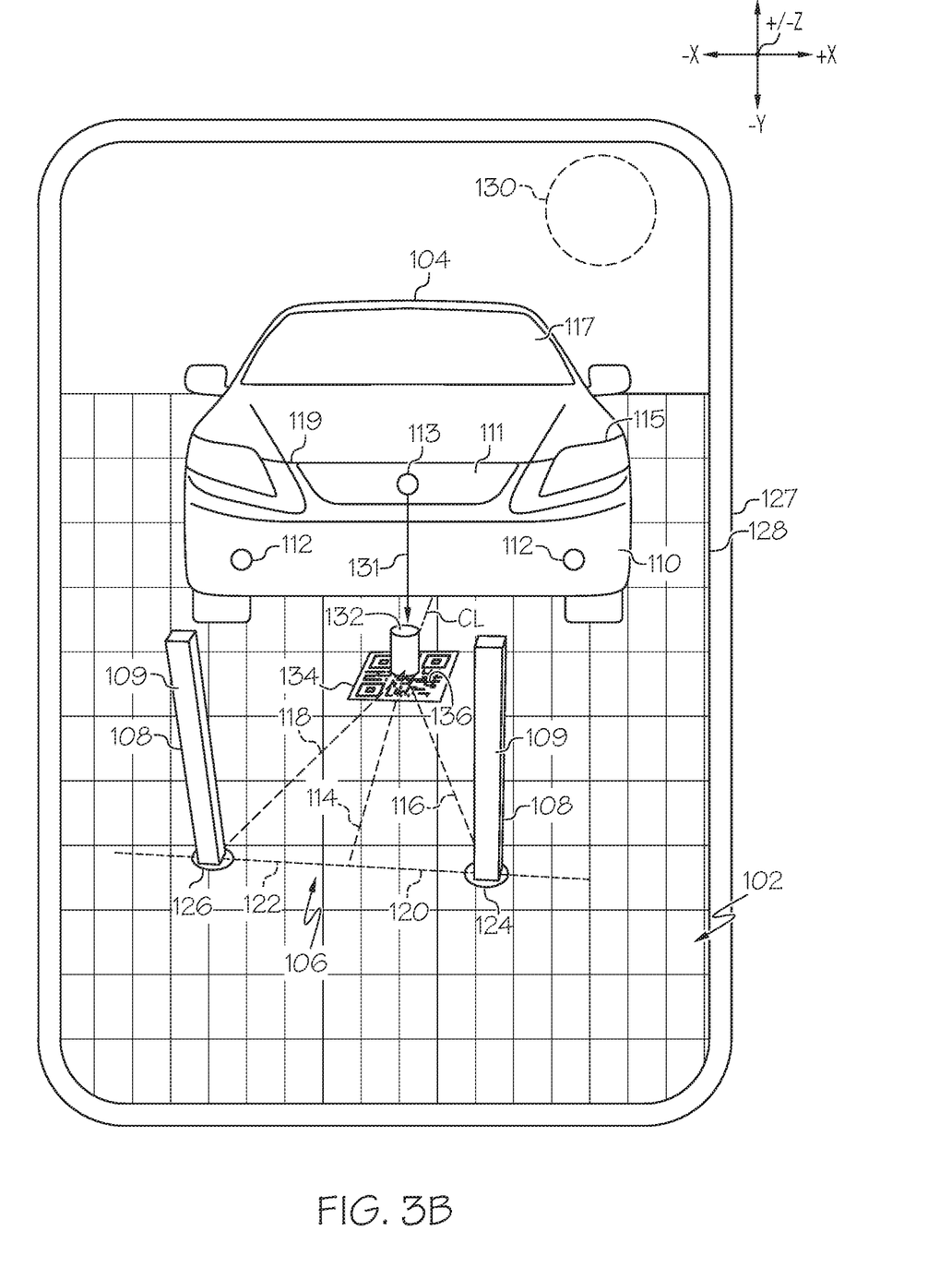
FIG. 3B schematically depicts a display showing the vehicle within the workspace of FIG. 1, according to one or more embodiments shown or described herein.

Referring now to FIG. 3B, after the visual indicator 136 is arranged along the true centerline CL and the optical sensor 130 has scanned the visual indicator 136 in order to retrieve the correct placement array 106 for the specific vehicle 104, the processor 129 will determine the origin point 132 based on the location of the visual indicator 136.

In some embodiments, the calibration system 100 may also use the physical features of the vehicle 104, such as the headlights 115, to further confirm the visual indicator 136 is in the correct location on the true centerline CL. Once the origin point 132 is determined within the workspace 102, the processor 129 displays on the display 128 the workspace 102 and the vehicle 104, with the placement array 106 and origin point 132 overlaid onto the live optical feed being detected by the optical sensor 130. The placement array 106 will be arranged within the workspace 102 based on the location of the origin point 132. The origin point 132 may be represented by a cylinder or marker, and may be overlaid on top of the visual indicator 136. In some embodiments, the origin point 132 represents the (0, 0, 0) coordinate plane origin for the workspace 102 in the X-Y-Z directions.

Referring again to FIG. 3B, once the origin point 132 is determined and the placement array 106 is displayed on the display 128, the right calibration location 124 and the left calibration location 126 will be represented within the workspace 102 through the display 128. At this time, the calibration targets 108 may be placed on top of the right calibration location 124 and the left calibration location 126. In some embodiments, the calibration system 100 will confirm that the calibration targets 108 are placed correctly on the right calibration location 124 and the left calibration location 126 prior to beginning any calibration process of the vehicle sensors 112. Additionally, the right calibration location 124 and the left calibration location 126 may change color on the display 128 to indicate to the user 10 that the calibration targets 108 are in the correct location. Once the calibration targets 108 are placed correctly on the right calibration location 124 and the left calibration location 126, the vehicle sensors 112 can be activated to being the calibration process.

It should be noted that even though the placement array 106 is arranged in front of the vehicle 104, the calibration system 100 can be used to calibrate any sensors arranged on the vehicle 104, including sensors arranged in the rear bumper, the top of the vehicle 104, the bottom of the vehicle 104, or on the sides of the vehicle 104.

Figure 4A:
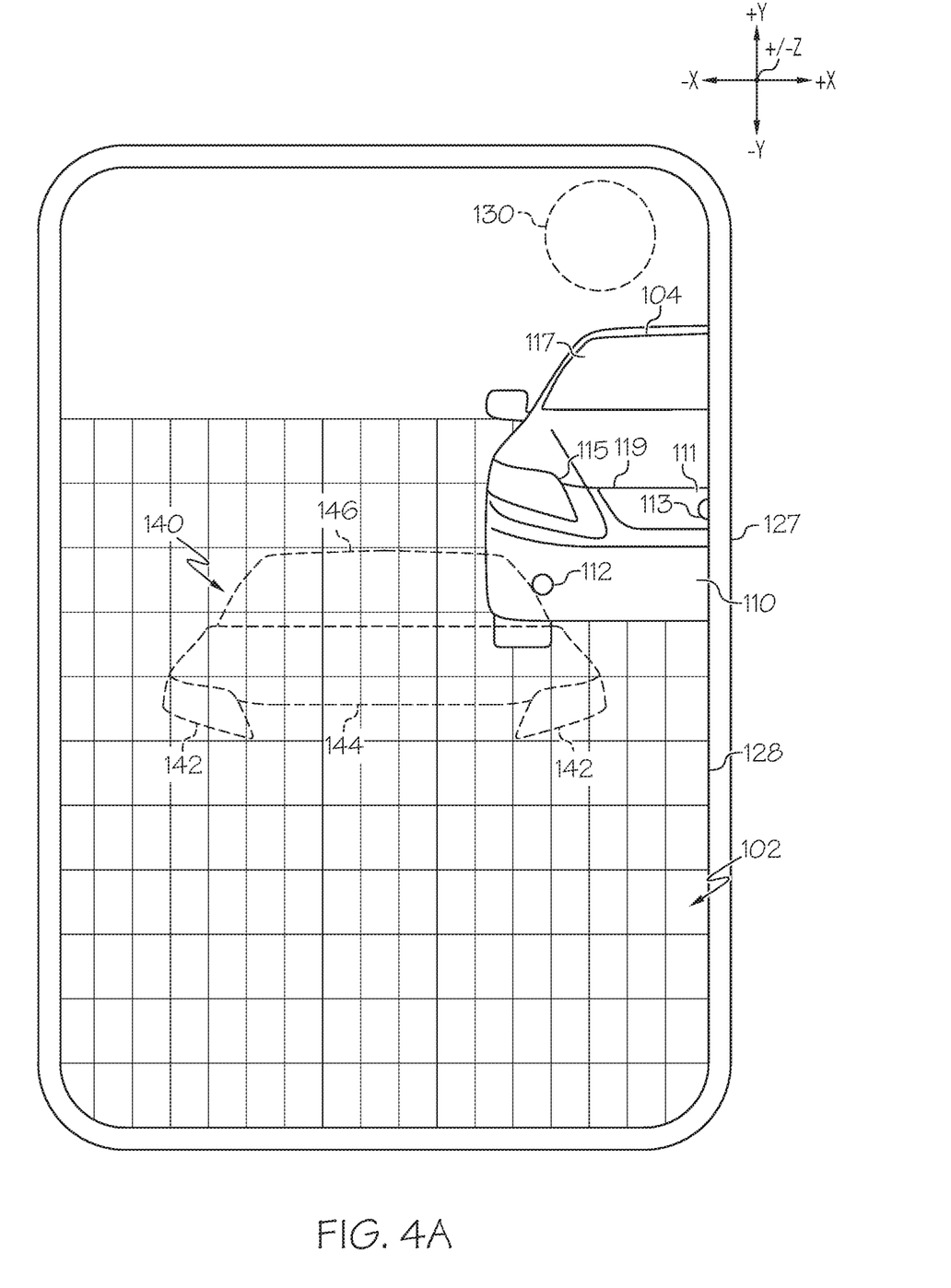
FIG. 4A schematically depicts a display showing the vehicle within the workspace of FIG. 1, according to one or more embodiments shown or described herein.

Referring now to FIG. 4A, another method of determining the origin point 132 includes utilizing a digital computer aided design (CAD) model 140 of the vehicle 104 in order to place the origin point 132 in the correct location. Similar to the method which utilized the reference marker 131 (FIG. 3A) a plurality of placement arrays 106 are stored within the database 20 to be retrieved by the processor 129. Also contained within the database 20 are the CAD models 140 or portions of the CAD models 140 for each vehicle 104 of the plurality of vehicles stored in the database 20. In order to place the origin point 132 in the correct location within the workspace 102, the CAD model 140 is aligned with the vehicle 104 being displayed on the display 128. After placing the vehicle 104 within the workspace 102 and activating the optical sensor 130, the optical sensor 130 collects an image of the vehicle 104 and sends the image to the processor 129. The processor 129 then determines the identifying information of the vehicle 104, such as the make, model, and year of production, and then communicatively couples with the database 20 to retrieve the CAD model 140 for that specific vehicle 104. The processor 129 then overlays the CAD model 140 with the live optical feed being detected by the optical sensor 130 also being displayed on the display 128.

In some embodiments, the CAD model 140 may be in various forms. For example, the CAD model 140 may only be a plurality of dashed or semi-transparent lines that represent major physical features of the vehicle 104, such as the front bumper 110, the vehicle sensors 112, the grille 111, the logo 113, the headlights 115, the windshield 117, and/or the hood 119. These dashed lines may include headlight outline 142, hood outline 144, and windshield outline 146.

Figure 4B:
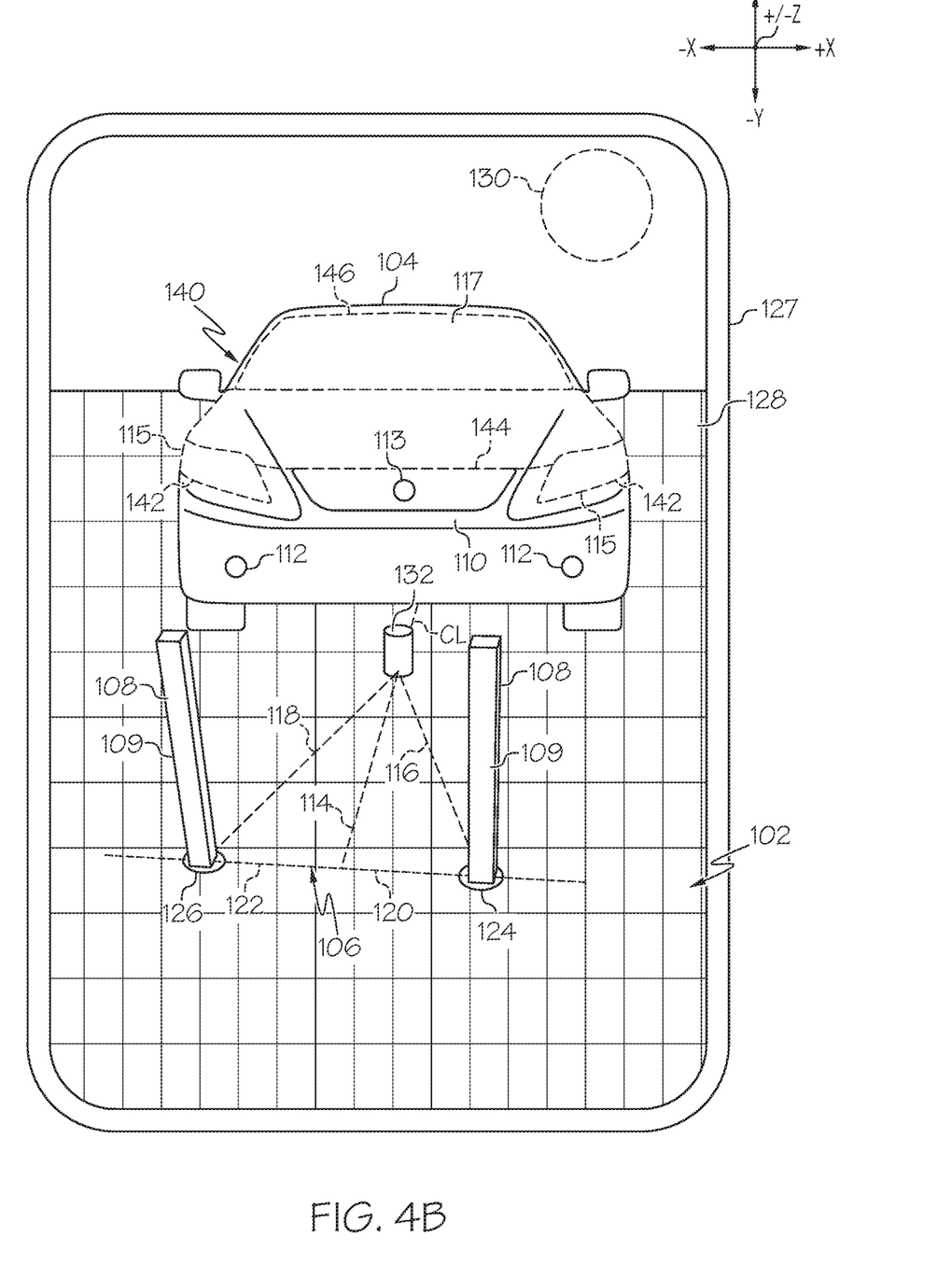
FIG. 4B schematically depicts a display showing the vehicle within the workspace of FIG. 1, according to one or more embodiments shown or described herein.

Now referring to FIG. 4B, with the CAD model 140 overlaid on the display 128, the user 10 can align the CAD model 140 with the vehicle 104 physically arranged within the workspace 102 in real-time. Once the CAD model 140 is aligned with the vehicle 104, the processor 129 will determine where the origin point 132 is located in the workspace 102. With the origin point 132 determined, the processor 129 then overlays the placement array 106 on the display 128. In some embodiments, the processor 129 has already retrieved the placement array 106 from the database 20 when the CAD model 140 is retrieved from the database 20. With the placement array 106 displayed on the display 128, the right calibration location 124 and the left calibration location 126 are displayed in the workspace 102. At this time, the calibration targets 108 may be placed on top of the right calibration location 124 and the left calibration location 126. In some embodiments, the calibration system 100 will confirm that the calibration targets 108 are placed correctly on the right calibration location 124 and the left calibration location 126 prior to beginning any calibration process of the vehicle sensors 112. Once the calibration targets 108 are placed correctly on the right calibration location 124 and the left calibration location 126, the vehicle sensors 112 can be activated to begin the calibration process.

Figure 5:
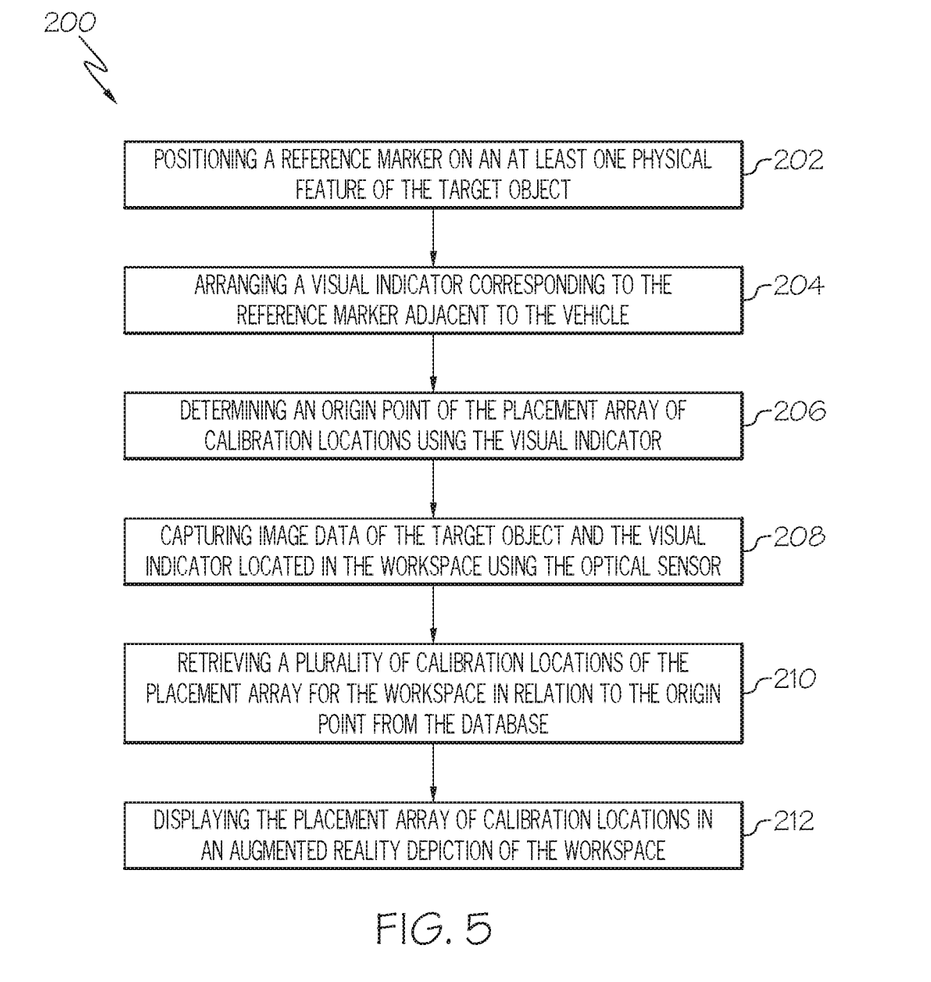
FIG. 5 depicts a method for displaying a placement array of calibration locations within the workspace of FIG. 1, according to one or more embodiments shown or described herein.

Referring now to FIG. 5, a flow chart depicting a method 200 for displaying a placement array 106 of calibration locations 124, 126 using the calibration system 100 (as illustrated in FIGS. 1-4B) is depicted. It is noted that while a number of steps are shown in a specific order, embodiments may include a greater or fewer number of steps in varying orders without departing from the scope of the present disclosure. To begin, at step 202 the method 200 may include positioning a reference marker 131 on an at least one physical feature of the target object, such as the logo 113 of the vehicle 104. For example, and with reference to FIGS. 1-4B, once the vehicle 104 is arranged within the workspace 102, a reference marker 131 is placed on a known physical center point of the vehicle 104, such as the logo 113 on the grille 111.

Referring again to FIG. 5, step 204 may include arranging a visual indicator 136 corresponding to the reference marker 131 adjacent to the vehicle 104. For example, and as described above, a visual indicator 136 on a substrate 134 can be arranged on the floor of the workspace 102 based on the reference marker 131. Step 206 may include determining an origin point 132 of the placement array 106 of calibration locations 124, 126 using the visual indicator 136, as illustrated in FIGS. 3A and 3B. For example, the optical sensor 130 may be activated to scan the visual indicator 136 and relay this information the processor 129, where the processor 129 determines the origin point 132 based on the location of the visual indicator 136 in the workspace 102.

Referring again to FIG. 5, step 208 may include capturing image data of the target object, such as the vehicle 104, and the visual indicator 136 located in the workspace 102 using the optical sensor 130 communicatively coupled to the processor 129. For example, the optical sensor 130 can read in the visual indicator 136, where the visual indicator 136 includes information that is relayed to the processor 129 in order to retrieve the correct placement array 106 form the database 20. Step 210 may include retrieving a plurality of calibration locations 124, 126 of the placement array 106 for the workspace 102 in relation to the origin point 132 from the database 20 communicatively coupled to the processor 129. Step 212 may include displaying, on a display 128 communicatively coupled to the processor 129, the placement array 106 of calibration locations 124, 126 in an augmented reality depiction of the workspace 102, where the placement array 106 of calibration locations 124, 126 is oriented in the workspace 102 based on the visual indicator 136 of the origin point 132, as illustrated in FIG. 3B.

Figure 6:
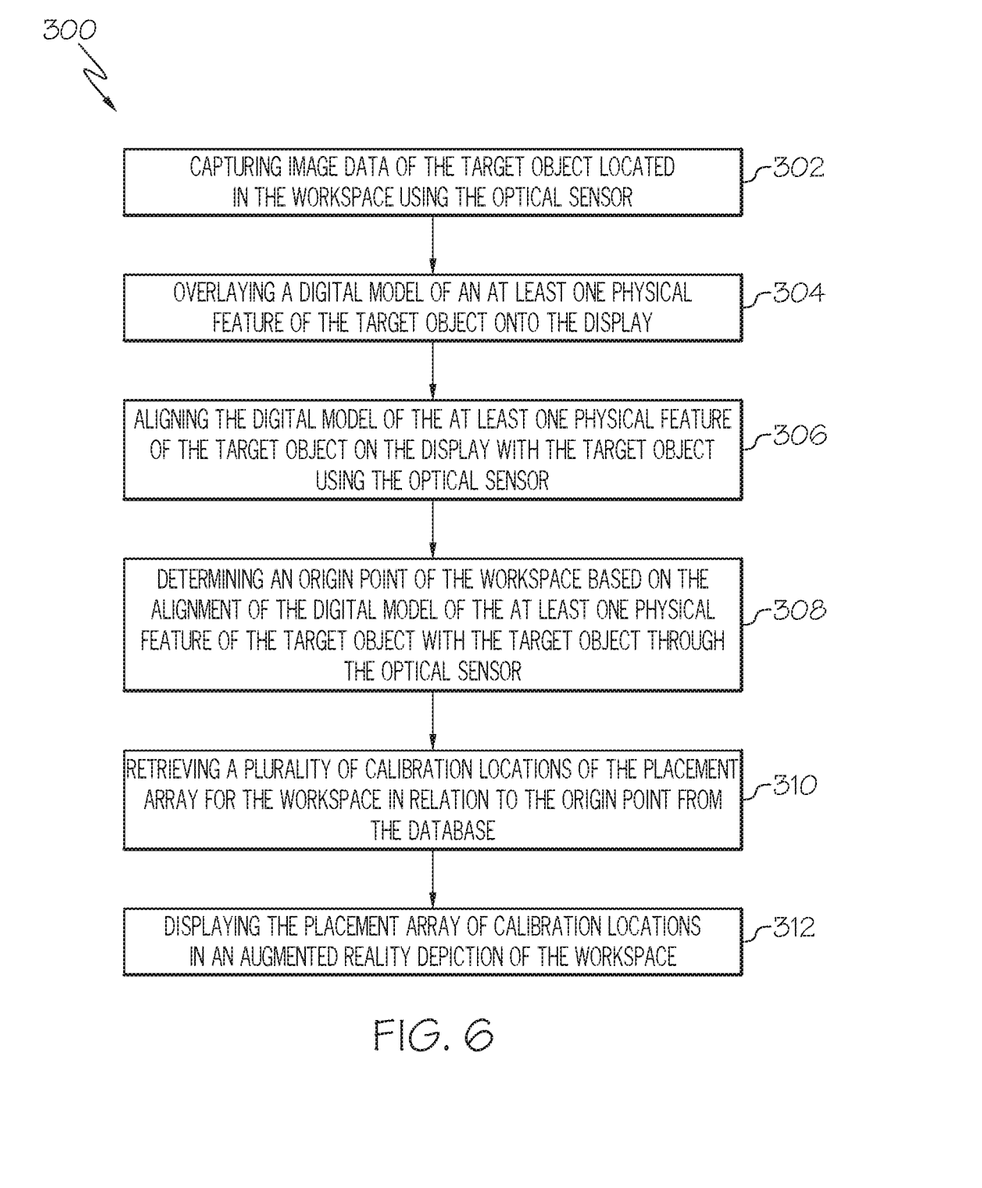
FIG. 6 depicts a method for displaying a placement array of calibration locations within the workspace of FIG. 1, according to one or more embodiments shown or described herein.

Referring now to FIG. 6, a flow chart depicting a method 300 for displaying a placement array 106 of calibration locations 124, 126 using the calibration system 100 (as illustrated in FIGS. 1-4B) is depicted. It is noted that while a number of steps are shown in a specific order, embodiments may include a greater or fewer number of steps in varying orders without departing from the scope of the present disclosure. To begin, at step 302 the method 300 may include capturing image data of the target object, such as the vehicle 104, located in the workspace 102 using the optical sensor 130 communicatively coupled to the processor 129. For example, the optical sensor 130 can be activated in order to begin the calibration process. In order to properly calibrate the vehicle sensors 112, the optical sensors 130 must have a clear view of the vehicle 104.

Referring again to FIG. 6, step 304 may include overlaying a digital model 140 of an at least one physical feature (i.e, the front bumper 110, the vehicle sensors 112, the grille 111, the logo 113, the headlights 115, the windshield 117, and/or the hood 119) of the vehicle 104 onto the display 128 communicatively coupled to the processor 129, as illustrated in FIG. 4A. Step 306 may include aligning the digital model 140 of the at least one physical feature of the vehicle 104 on the display 128 with the vehicle 104 using the optical sensor 130, as illustrated in FIG. 4B.

Referring again to FIG. 6, step 308 may include determining an origin point 132 of the workspace 102 based on the alignment of the digital model 140 of the at least one physical feature of the vehicle 104 with the vehicle 104 through the optical sensor 130. Step 310 may include retrieving a plurality of calibration locations 124, 126 of the placement array 106 for the workspace 102 in relation to the origin point 132 from the database 20 communicatively coupled to the processor 129. Step 312 may include displaying, on the display 128, the placement array 106 of calibration locations 124, 126 in an augmented reality depiction of the workspace 102, where the placement array 106 of calibration locations 124, 126 is oriented in the workspace 102 based on the origin point 132, as illustrated in FIG. 4B.

Additionally, the systems and methods for determining proper calibration target positioning can include an authoring tool (not shown) to develop the placement array 106 of calibration locations 124, 126 for each vehicle 104. The authoring tool would allow a user 10 to design the placement array 106 of calibration locations 124, 126, and then upload the placement array 106 to the database 20 which can be accessed while calibrating the vehicle sensors 112 using augmented reality.

Additionally, in some embodiments of the calibration system 100, the visual indicator 131 and origin point 132 may be arranged in a fixed location within the workspace 102. For example, the visual indicator 131 may be mounted to support pillars or walls (not shown) of the workspace 102 prior to the vehicle 104 being arranged within the workspace 102. The workspace 102 itself may be pre-calibrated since the visual indicator 131 is already fixedly arranged in the workspace 102. As vehicle 104 is arranged within the workspace 102, the vehicle 104 will be aligned with the visual indicator 131, such as lines or markings on the wall which a driver of the vehicle 104 can see as they pull into the workspace 102. The visual indicator 131 may be arranged adjacent to the car, or the visual indicator 131 may be arranged away from the vehicle 104 within the workspace 102. The vehicle 104 may be adjusted within the workspace 102 in order to align the vehicle 104 with the visual indicator 131. Once the vehicle 104 is properly arranged with respect to the visual indicator 131 within the workspace 102, the method 200 for displaying a placement array 106 of calibration locations 124, 126 using the calibration system 100 (as illustrated in FIGS. 1-4B) can be activated as described above in order to determine the origin point 132 and the calibration locations 124, 126. In some embodiments, the origin point 132 may be adjacent to the vehicle 104, or may be arranged a distance away from the vehicle 104 within the workspace 102.

It should now be understood that embodiments described herein are directed to systems and methods for displaying a placement array of calibration locations. The systems and methods include minimal human error in the calibration of the sensors arranged within a vehicle since an augmented reality workspace is used to calculate and display the calibration target locations in real-time on a display. The systems and methods include capturing image data of a target object located in a workspace using an optical sensor, such as a mobile device camera. Classification data is received from the image data based on the object within the view of the optical sensor, which allows for the vehicle being calibrated to be identified in order to retrieve the correct placement array. An origin point of the placement array of calibration locations based on the image data is determined, with the origin point being arranged within the workspace. A plurality of calibration positions for the workspace in relation to the origin point is retrieved from a database communicatively coupled to the processor, where the calibration locations are based on the classification data from the image data. The database includes a plurality of different placement arrays which correspond to a plurality of different vehicles having different makes and models. The placement array of calibration locations is displayed on the display, showing an augmented reality depiction of the workspace to a user, where the placement array of calibration locations is oriented in the workspace based on the origin point. Furthermore, the system and method for displaying a placement array of calibration locations minimizes human error in order to calibrate sensors on the vehicle. Accordingly, the method for displaying a placement array of calibration locations can be more accurate and less time consuming than traditional methods using measuring means such as string or tape.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A system for displaying a placement array of calibration locations, the system comprising:
   an optical sensor;
   a display communicatively coupled to the optical sensor;
   a processor;
   one or more memory modules communicatively coupled to the processor; and machine readable instructions stored in the one or more memory modules that cause the optical sensor and the display to perform at least the following when executed by the processor:
capture image data of a target object located in a workspace using the optical sensor communicatively coupled to the processor, wherein the target object is a vehicle;
retrieve classification data from a database communicatively coupled to the processor, wherein the classification data is received from the image data;
determine an origin point of the placement array of calibration locations based on the image data;
retrieve a plurality of calibration positions of the placement array for the workspace in relation to the origin point from the database, wherein the calibration locations are based on the classification data; and
display, on the display communicatively coupled to the processor, the placement array of calibration locations in an augmented reality depiction of the workspace, wherein the placement array of calibration locations is oriented in the workspace based on the origin point.

2. The system of claim 1, wherein when executed by the processor, the machine readable instructions further cause the optical sensor and the display to:
determine a classification of the target object based on the classification data, wherein retrieving the placement array of calibration locations from the database is based on the classification of the target object.

3. The system of claim 1, wherein calibration targets are arranged on the calibration locations, and an at least one vehicle sensor of the target object uses the calibration targets to perform a calibration process.

4. The system of claim 3, wherein the optical sensor verifies that the calibration target is arranged on the calibration location prior to the at least one sensor of the target object performing the calibration process.

5. The system of claim 1, wherein the origin point is a physical marker operatively arranged adjacent to the target object in the workspace.

6. The system of claim 5, wherein the physical marker corresponds to at least one physical feature of the target object.

7. The system of claim 1, wherein the origin point is a physical marker fixedly arranged in the workspace.

8. The system of claim 1, further comprising:
overlaying a plurality of physical features of the target object on the display; and
aligning the plurality of physical features overlaid on the display with the target object to determine the origin point of the placement array of calibration locations.

9. A method for displaying a placement array of calibration locations, the method comprising:
positioning a reference marker on an at least one physical feature of a target object comprising a vehicle;
arranging a visual indicator corresponding to the reference marker adjacent to the target object;
determining an origin point of the placement array of calibration locations using the visual indicator;
capturing image data of the target object and the visual indicator located in a workspace using an optical sensor communicatively coupled to a processor;
retrieving a plurality of calibration locations of the placement array for the workspace in relation to the origin point from a database communicatively coupled to the processor; and
displaying, on a display communicatively coupled to the processor, the placement array of calibration locations in an augmented reality depiction of the workspace, wherein the placement array of calibration locations is oriented in the workspace based on the visual indicator of the origin point.

10. The method of claim 9, wherein the origin point is determined by a physical measurement.

11. The method of claim 10, wherein the visual indicator is arranged on a substrate arranged on a floor of the workspace adjacent to the target object.

12. The method of claim 11, wherein the visual indicator is a barcode corresponding to the target object.

13. The method of claim 9, further comprising:
arranging a calibration target on the calibration locations; and
performing a calibration process using the calibration target to calibrate an at least one sensor of the target object.

14. The method of claim 13, wherein the optical sensor verifies that the calibration target is arranged on the calibration location prior to calibrating the at least one sensor of the target object.

15. A method for displaying a placement array of calibration locations, the method comprising:
capturing image data of the target object located in a workspace using an optical sensor communicatively coupled to a processor, wherein the target object comprises a vehicle;
overlaying a digital model of an at least one physical feature of the target object onto a display communicatively coupled to the processor;
aligning the digital model of the at least one physical feature of the target object on the display with the target object using the optical sensor;
determining an origin point of the workspace based on the alignment of the digital model of the at least one physical feature of the target object with the target object through the optical sensor;
retrieving a plurality of calibration locations of the placement array for the workspace in relation to the origin point from a database communicatively coupled to the processor; and
displaying, on the display, the placement array of calibration locations in an augmented reality depiction of the workspace, wherein the placement array of calibration locations is oriented in the workspace based on the origin point.

16. The method of claim 15, further comprising:
determining a classification of the target object using the image data, wherein retrieving the placement array of calibration locations from the database is based on the classification of the target object.

17. The method of claim 15, wherein the at least one physical feature of the target object comprises of a position in relation to the target object of:
a headlight;
a seam between two body panels;
a door;
a logo; or
a vehicle bumper.

18. The method of claim 15, further comprising:
arranging a calibration target on the calibration locations; and
performing a calibration process using the calibration target to calibrate an at least one sensor of the target object.

19. The method of claim 18, wherein the optical sensor verifies that the calibration target is arranged on the calibration location prior to calibrating the at least one sensor of the target object.

20. The method of claim 15, wherein the origin point is arranged adjacent to the target object in the workspace.

* * * * *

UNITED STATES PATENT AND TRADEMARK OFFICE
CERTIFICATE OF CORRECTION

PATENT NO. : 11,118,948 B2
APPLICATION NO. : 16/549416
DATED : September 14, 2021
INVENTOR(S) : Philip W. Ryan et al.

Page 1 of 1

It is certified that error appears in the above-identified patent and that said Letters Patent is hereby corrected as shown below:

On the Title Page

In Column 2, item (56), other publications, cite no. 1, delete "Bosch DAS 1000 calibration set: professional adjustment of sensors and cameras of driver assistance systems (https://www.bosch-presse.de/pressportal/de/enibosch-das-1000-calibration-set-professional-adjustment-of-sensors-and-cameras-of-driver-assistance-systems-151808.html) Published date: Mar. 19, 2019." and insert --Bosch DAS 1000 calibration set: professional adjustment of sensors and cameras of driver assistance systems (https://www.bosch-presse.de/pressportal/de/en/bosch-das-1000-calibration-set-professional-adjustment-of-sensors-and-cameras-of-driver-assistance-systems-151808.html) Published date: Mar. 19, 2019.--, therefor.

In the Specification

In Column 4, Line(s) 29, delete "objet" and insert --object--, therefor.

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*